…

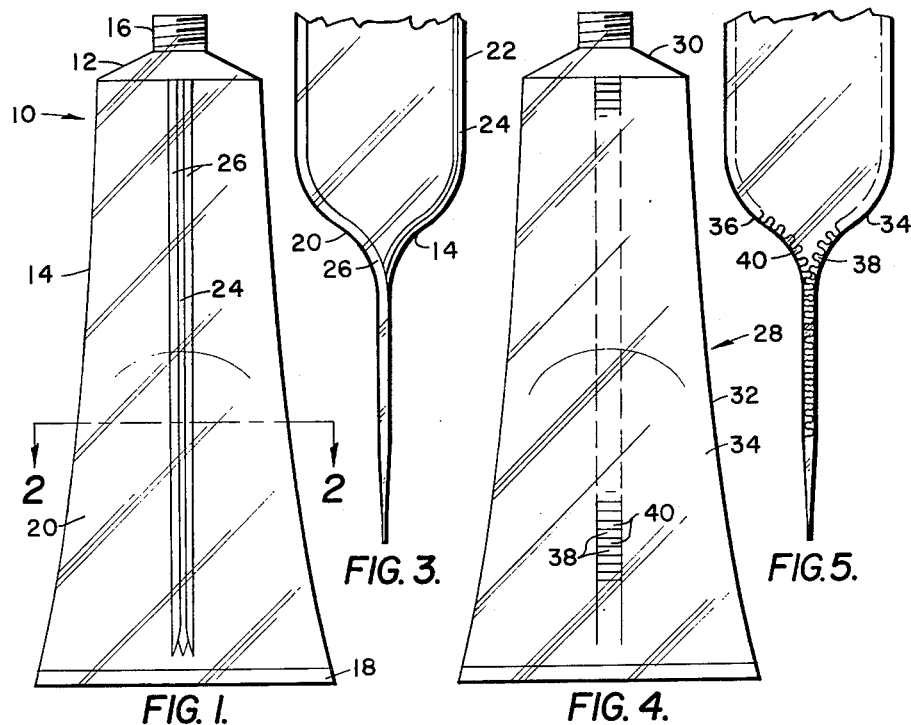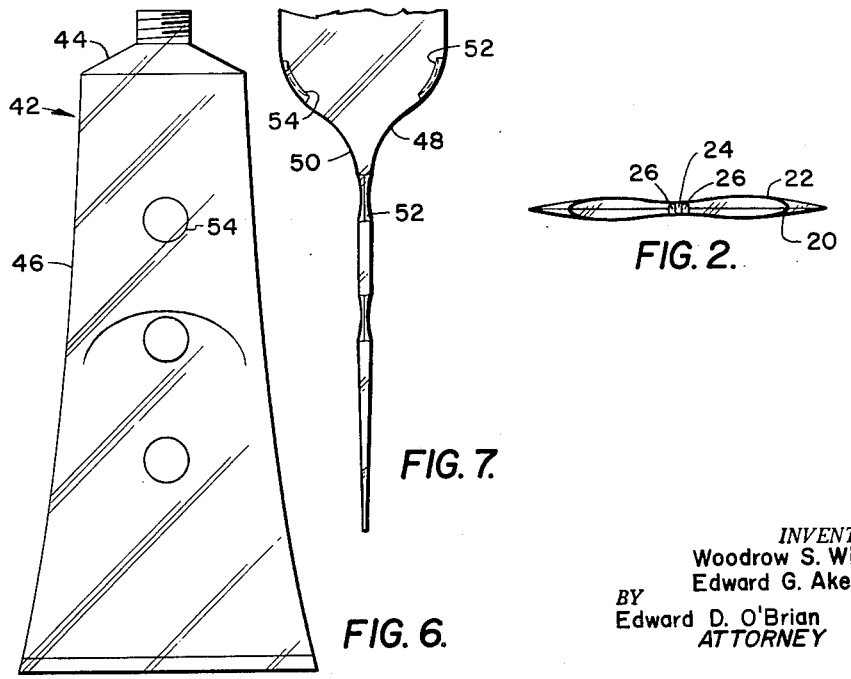

United States Patent Office 3,198,392
Patented Aug. 3, 1965

3,198,392
TUBE COLLAPSING STRUCTURE
Woodrow S. Wilson, Pasadena, and Edward G. Akers, Downey, Calif., assignors to Polytop Corporation, Slatersville, R.I., a corporation of Massachusetts
Filed Nov. 5, 1963, Ser. No. 321,539
1 Claim. (Cl. 222—107)

This invention is directed to a tube collapsing structure.

In the field of merchandising and packaging, the use of collapsing tubes for the sale and storage of toiletries, medicinals, paint and other materials is well known. These tubes are normally impact molded out of an aluminum alloy because of the ductility and collapsibility of such alloys. The feature of ductility permits the tube to be self-supporting both when it is empty and when it is filled, and yet permits the tube to be squeezed and lie flat when it is desired that the contents thereof be exhausted. Such alloys are disadvantageous in some applications because of the chemical reactivity thereof. Furthermore, the metallic alloy tubes must be decorated for most merchandising applications for the metallic tube itself does not have a suitable appearance for modern merchandising. A superior tube could be molded out of a suitable polymer composition and find ready application, if such a tube could be manufactured in such a manner as to remain collapsed after the contents thereof are partially discharged. This is particularly true in those cases where the tube contents are such that the entry of air into the tube will cause deterioration thereof.

Accordingly it is an object of this invention to provide a tube of polymer composition material which is particularly suited for use with contents which are subject to damage or drying out by the presence of air within the tube.

It is another object of this invention to particularly provide a tube which is made of a flexible, self-supporting, inert polymer composition and is of such design as to have its sides remain together after they are squeezed together for the discharge of the materials within the tube.

It is another object of this invention to provide a tube of flexible, self-supporting, inert polymer composition having cooperating means on the inside thereof for maintaining the tube in a closed position after it has been squeezed for the partial discharge of contents thereof.

Other objects and advantages of this invention will become apparent upon study of the following portion of this specification and the attached drawings in which:

FIGURE 1 is a side elevation of the tube in accordance with this invention;

FIGURE 2 is a transverse section taken along the line 2—2 of FIGURE 1;

FIGURE 3 is a longitudinal partial section taken through the tube of FIGURE 1;

FIGURE 4 is a side elevation of another embodiment of this invention;

FIGURE 5 is a longitudinal partial section of the tube of FIGURE 4;

FIGURE 6 is a side elevation of another embodiment of a tube made in accordance with this invention; and FIGURE 7 is a partial section taken lengthwise through the tube of FIGURE 6.

In summary, this invention is directed to an article of manufacture which comprises a tube for the use in storage, transportation, merchandising, and dispensing of various materials. These materials include paint, glue, medicinals, cosmetics, soaps and similar liquid or pasty products. This article is made of a flexible, self-supporting, inert, polymer composition such as polyolefins like polethylene and polypropylene, polyurethanes, plasticized polyvinyl chloride, polyvinyl acetate or other equivalent linear or non-linear compositions. The design of the tube is of such nature as to permit its use to contain and dispense materials which are damaged by the presence of air within the tube, such as for example, the drying out of toothpaste. The invention contemplates providing means on the inside walls of the tube so that upon squeezing the tube for the discharge of at least part of the contents thereof the means come in contact with each other and hold the sides of the tube together. Thus, they do not spring open and draw air into the tube. The means employed to hold the side walls together after they are squeezed together include cooperating ridges or fingers which interengage, or flexible concavities which cooperate with the opposite side of the tube to create suction in the manner of a suction cup to hold the sides of the tube together.

This invention will be understood in greater detail by reference to the following portion of this specification wherein the drawings are referred to in detail. One embodiment of the invention is seen in FIGURES 1, 2, and 3 wherein a tube 10 has a top 12 and a body 14. The top 12 is of conventional configuration and the material therein is thicker than in the body so that it is substantially rigid. The top 12 is fitted with a closure means such as screw 16 to permit a cap to be placed thereon for closure of a top, material exhaust hole encompassed by the screw 16. The closure, including the screw 16 is not part of this invention and may be of an other convenient nature. The body 14 is of relatively thin wall construction and is flexible, so that the body 14 may be deformed by finger pressure to exhaust the contents of the tube 10 out of the top, when such discharge is desired. The material of tube 10 is a flexible, self-supporting, inert polymer composition such as one of the polyolefins like polyethylene or polypropylene, polyurethane, plasticized polyvinyl chloride, polyvinyl acetate of equivalent materials. These materials are well suited to this application because of their physical and chemical properties. Also, the appearance of such materials makes them superior to those formerly used for such tubes. The lower part of the body 14 is preferably molded with oval configuration and is molded with an open end, at the bottom as seen in FIGURE 1. Either before or after the material to be stored within the body 14 of the tube is inserted therein, the open end of the body 14 is closed by means of closing it flat along its bottom termination, and applying means to hold it in this flattened configuration. The conventional closure of such bodies is accomplished by heat sealing of the lower edge 18. Such sealing can be accomplished when the tube is fitted while it is in an inverted position. Adhesives could alternately be used. An additional piece of material could be folded over the bottom and up each side to be heat sealed or adhesively secured thereto for closure of the bottom of the body 14.

The body 14 has a first side 20 and a second side 22, and by means of the inventive concept herein disclosed these sides are held together after they are squeezed together for the discharge of contents of the tube. Holding means are provided on the inside of the sides 20 and 22, and in the embodiment of FIGURES 1, 2, and 3 these holding means include at least one ridge 24 molded on the inside of side 22 and running longitudinally of the tube body 14. The side 20 has molded on the inside thereof at least two ridges 26 which extend lengthwise of the body 14 of the tube. The configuration of the ridges 24 and 26 is such that the ridge 24 provides a bulbous protuberance which fits between and within the appropriate recess defined by the two ridges 26, said recess being wider toward the wall 20 than it is in a position closer to the wall 22. Thus, when the walls sides 20 and 22 are squeezed together by manual effort, the ridge 24 enters within the recess provided between the ridges 26 and it is retained therein by means of the particular shape provided.

In the embodiment of FIGURES 4 and 5 a tube 28 is provided with a top 30 and a body 32. The tube 28 is made of the same class of material as the tube of FIGURE 1. The body 32 is again molded in oval configuration throughout a substantial part of its length, and is closed at its bottom, as seen in FIGURE 4, similarly to the tube of FIGURE 1. The body 32 has first and second sides 34 and 36 which molded on the interior walls thereof short transverse ridges 38 and 40 respectively. The ridges 38 and 40 may be of the same or different configuration, but are particularly designed to interlock with each other when they are pressed together. As shown they are formed with bulbous protuberances farther away from the respective walls, and with recesses therebetween of such dimensions as to receive and hold the associated ridge of the opposite side when it is pressed therein by manual effort. The series of ridges 38 and 40 extend from substantially near the bottom of the body 32 to substantially near the top so that the sides 34 and 36 may be progressively pressed together and retained in the flattened position.

In the embodiment shown in FIGURES 6 and 7 the tube 42 has a top 44 and a body 46. Again the top 44 may be provided with a screw type or other closure as is convenient and desired in a particular application. The tube 42 is made of one of the same class of hereinbefore recited flexible, self-supporting, inert, polymer compositions, preferably by injection molding techniques, as are the tubes of the embodiments of FIGURES 1 and 4. The tube 42 has a first side 48 and a second side 50 on the body 46, and may be molded in oval configuration as has been hereinbefore mentioned. Similarly the bottom of the body 46 may be closed by any convenient means such as adhesives or heat sealing with or without the application of additional, fold-over material to aid in the closure. In this embodiment at least one of the sides 48 and 50 has molded on the inside thereof concave cups 52, as are shown on side 48. Such cups act as suction cups when they are in engagement with the opposite side and retain the two sides in contact with each other. Accordingly cups 52 on only one side are sufficient for holding the body 46 in a closed position when the side opposite the cup 52, in contact therewith, is sufficiently smooth for proper suction cup engagmeent. In some cases it may be desirable to mold suction cups 54 on the side 50, as is shown in FIGURE 7 so that interengagement of the two suction cups 52 and 54 hold the sides 48 and 50 together, after the suction cups are pressed together, as shown in the lower portion of FIGURE 7.

It can be seen from the specification that this invention is directed to means to hold together the sides of a tube of polymer composition when the contents thereof are partially exhausted. It is clear that this invention is subject to numerous modifications and embodiments without the exercise of the inventive faculty. Accordingly the scope of this invention is defined by the scope of the following claim.

We claim:

An article of manufacture, said article of manufacture comprising:

a tube adapted to contain material, said tube having first and second walls, said tube being formed of a flexible, self-supporting, inert polymer composition material, said tube having a top and a body;

said top having an openable closure adapted to open to discharge material from within the interior of said tube body and adapted to be closed to maintain material within said tube body and protect material within said tube body;

said body having a top end and a bottom end;

said top being secured to said top end of said body;

said bottom end of said body being closable along a generally straight line extending transversely of said tube;

means formed on the inside of at least said first side of said tube, said means comprising at least two cups formed integrally with said first tube wall and preventing an inwardly directed concave surface when in unstressed condition, said cups being adapted to engage with said second wall of said tube to hold first and second walls in proximity to each other after at least some of the material in said tube is discharged whereby the separation of said first and second walls due to the flexibility of said flexible, self-supporting, inert polymer composition material is prevented.

References Cited by the Examiner

UNITED STATES PATENTS

| | | | |
|---|---|---|---|
| 760,040 | 5/04 | Tatum. | |
| 1,213,392 | 1/17 | Maloney | 24—262 X |
| 1,751,341 | 3/30 | Leisse | 222—92 |
| 2,024,429 | 12/37 | Casey | 150—1 |
| 2,092,444 | 9/53 | Dennery. | |
| 2,661,741 | 12/53 | Puckman | 222—215 X |
| 2,753,088 | 7/56 | Prahl | 222—215 X |
| 3,029,852 | 4/62 | Taylor | 150—1 |

FOREIGN PATENTS 89,633  8/60  Denmark.

RAPHAEL M. LUPO, *Primary Examiner.*